(12) United States Patent
Qi

(10) Patent No.: US 9,967,930 B2
(45) Date of Patent: May 8, 2018

(54) DRIVE SYSTEM OF SEMICONDUCTOR LIGHT SOURCE, AND SEMICONDUCTOR LIGHTING DEVICE

(71) Applicant: Opple Lightning Co., Ltd., Shanghai (CN)

(72) Inventor: Xiaoming Qi, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 0 days. days.

(21) Appl. No.: 14/404,775

(22) PCT Filed: May 22, 2013

(86) PCT No.: PCT/CN2013/076105
§ 371 (c)(1),
(2) Date: Dec. 1, 2014

(87) PCT Pub. No.: WO2013/181993
PCT Pub. Date: Dec. 12, 2013

(65) Prior Publication Data
US 2015/0145432 A1   May 28, 2015

(30) Foreign Application Priority Data
Jun. 4, 2012   (CN) .......................... 2012 1 0181467

(51) Int. Cl.
*H05B 37/02* (2006.01)
*H05B 39/04* (2006.01)
(Continued)

(52) U.S. Cl.
CPC ..... *H05B 33/0815* (2013.01); *H05B 33/0818* (2013.01); *H05B 33/0851* (2013.01);
(Continued)

(58) Field of Classification Search
CPC ............ H05B 33/0815; H05B 33/0818; H05B 33/0851; H05B 41/2827; H05B 41/282;
(Continued)

(56) References Cited

U.S. PATENT DOCUMENTS

| 6,856,103 B1* | 2/2005 | Hudson ................. H05B 39/02 |
| | | 315/200 R |
| 2006/0133117 A1* | 6/2006 | genannt |
| | | Berghegger ........ H02M 3/3385 |
| | | 363/19 |

(Continued)

FOREIGN PATENT DOCUMENTS

| CN | 1498052 | 5/2004 |
| CN | 1863423 | 11/2006 |

(Continued)

OTHER PUBLICATIONS

European Search Report dated Jul. 16, 2015.
European Office Action dated May 2, 2016.

*Primary Examiner* — Alexander H Taningco
*Assistant Examiner* — Christian L Garcia
(74) *Attorney, Agent, or Firm* — Dilworth & Barrese, LLP; Michael J. Musella, Esq.

(57) ABSTRACT

The present disclosure provides a driving system for a semiconductor light source and a semiconductor lighting device. The driving system comprises: a transformer, the transformer comprising a first coil (201) and a second coil (202) mutually coupled to each other, the second coil (202) being used for receiving an input voltage; a switching device which is connected in series to the second coil (202) and used for controlling energy storage and energy release of the second coil (202); and an outputting device which is connected in parallel to the second coil (202) and used for supplying power to the semiconductor light source. An induced signal is generated on the first coil of the trans- (Continued)

former due to a coupling effect between the first coil and the second coil and is used for controlling the switching-on and switching-off of the switching device.

6 Claims, 4 Drawing Sheets

(51) Int. Cl.
*H05B 41/36* (2006.01)
*H05B 33/08* (2006.01)
*H05B 41/282* (2006.01)
*G09G 3/34* (2006.01)
*H02M 3/156* (2006.01)

(52) U.S. Cl.
CPC ........... *G09G 3/3406* (2013.01); *H02M 3/156* (2013.01); *H05B 41/282* (2013.01); *H05B 41/2827* (2013.01); *Y02B 20/185* (2013.01); *Y02B 20/346* (2013.01); *Y10S 315/05* (2013.01); *Y10S 315/07* (2013.01)

(58) Field of Classification Search
CPC ... Y10S 315/07; Y10S 315/05; Y02B 20/346; Y02B 20/185; G09G 3/3406; H02M 3/156

USPC ............ 315/224, 307, 291; 363/16, 49, 131, 363/21.17, 89
See application file for complete search history.

(56) References Cited

U.S. PATENT DOCUMENTS

| | | | |
|---|---|---|---|
| 2010/0148692 A1 | 6/2010 | Biegel | |
| 2010/0308733 A1* | 12/2010 | Shao | H02M 1/4225 315/119 |
| 2010/0328972 A1* | 12/2010 | Pollak | H02M 1/36 363/21.17 |
| 2011/0260651 A1 | 10/2011 | Fujimura et al. | |
| 2012/0230061 A1* | 9/2012 | Okitsu | H02M 1/36 363/19 |

FOREIGN PATENT DOCUMENTS

| | | |
|---|---|---|
| CN | 101048052 | 10/2007 |
| CN | 101652005 | 2/2010 |
| CN | 102042508 | 5/2011 |
| CN | 202663608 | 1/2013 |
| JP | H0880042 | 3/1996 |
| WO | 9636103 | 11/1996 |
| WO | 2008137460 | 11/2008 |

* cited by examiner

DRIVE SYSTEM OF SEMICONDUCTOR LIGHT SOURCE, AND SEMICONDUCTOR LIGHTING DEVICE

TECHNICAL FIELD OF THE DISCLOSURE

The present disclosure relates to a driving system for a semiconductor light source, and more particularly to a driving system for a buck-boost semiconductor light source.

BACKGROUND

A semiconductor light source such as LED is a light source and a display device produced by a third generation semiconductor material with lower power consumption, long lifespan, no pollution, rich colors, high controllability and other characteristics, which is a revolution in lighting sources and lighting industry. With development of LED, there are more and more LED lighting products in the market. An electronic driving portion for LED is an indispensable component in a LED lighting product.

From a viewpoint of the LED market, a LED lighting device still has a higher price than a traditional light bulb or an energy saving lamp, and how to reduce the price of a LED lighting device has become a key-point of improving market acceptance.

With descending of price of a LED unit, the price of the electronic driving portion plays a more important role in the total price of a LED lighting product. Currently, most of the LED driving circuits popularly used in the market adopt an IC controller, the main drawback of which is a higher price. If the IC controller is not adopted, a fly-back self-excited oscillation circuit is usually adopted, but such circuit has a low efficiency and a poor stability and only can output a narrow range of voltage.

SUMMARY

The present disclosure aims to provide an electronic driving circuit for a LED lighting product with a simple structure, a broader range of applications, and a low cost. In the present disclosure, a less number of elements are combined to form a self-excited oscillation circuit, and a buck-boost circuit is then combined to form a LED electronic driver. In the present disclosure, fewer elements are used to constitute an electronic driving portion for LED, which ensures a huge reduction of the number and cost of elements and a huge reduction of a percentage of the electronic driving portion in the LED lighting system, thereby the electronic driving portion has a high efficiency and is suitable to output a wide range of voltage.

In an embodiment of the present disclosure, there is provided a driving system for a semiconductor light source including: a transformer including a first coil and a second coil coupled to each other, the second coil receiving an input voltage; a switching means connected to the second coil of the transformer in series and for controlling energy-storing and energy-releasing of the second coil; an outputting means connected to the second coil of the transformer in parallel and for supplying power to the semiconductor light source, wherein an induced signal is generated on the first coil of the transformer due to a coupling effect between the first coil and the second coil and is used for controlling turn-on or turn-off of the switching means.

In the embodiment of the present disclosure, the driving system further includes a starting means for starting the switching means when the input signal is initially supplied.

In the embodiment of the present disclosure, the switching means includes a switch and at least one discrete element, wherein the at least one discrete element is connected between the first coil and a control terminal of the switch, and the induced signal is used to control the switch via the at least one discrete element. Those skilled in the art should understand that the discrete elements include the elements such as resistors, capacitors, inductors opposite to an integrated circuit. In the embodiment of the present disclosure, the at least one discrete element includes a capacitive element.

In the embodiment of the present disclosure, the at least one discrete element further includes a resistive element, and the capacitive element and the resistive element are connected in series.

In the embodiment of the present disclosure, the starting means includes a resistive element and a unidirectional conducting element connected together in series, a connection point between the resistive element and the unidirectional conducting element is connected to the control terminal of the switch.

In another embodiment of the present disclosure, there is further provided a semiconductor lighting device including: a semiconductor light source as a load; a transformer including a first coil and a second coil coupled to each other, the second coil receiving an input voltage; a switching means connected to the second coil of the transformer in series and for controlling energy-storing and energy-releasing of the second coil; an outputting means connected to the second coil of the transformer in parallel and for supplying power to the semiconductor light source as the load, wherein an induced signal is generated on the first coil of the transformer due to a coupling effect between the first coil and the second coil and is used for controlling turn-on or turn-off of the switching means.

With descriptions given below to the present disclosure with reference to accompanying drawings, other purposes and utilities of the present disclosure will become apparent and the reader can fully understand the present disclosure.

BRIEF DESCRIPTION OF THE DRAWINGS

In the above described accompanying drawings, same reference numerals indicate same, similar or corresponding elements or functions.

DETAILED DESCRIPTION

Below, particular embodiments of the present disclosure will be described in detail with reference to the accompanying drawings.

Figure 1:
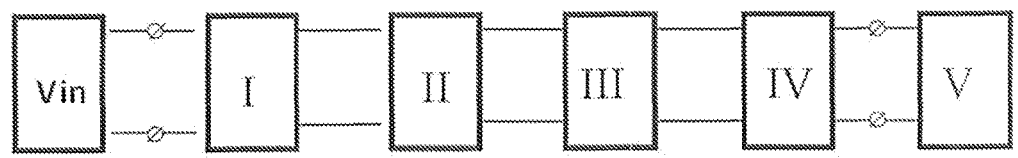
FIG. 1 is a schematic diagram of a driving system for a semiconductor light source.

FIG. 1 is a schematic diagram of a driving system for a semiconductor light source according to an embodiment of the present disclosure.

In FIG. 1, Vin represents an input voltage. The input voltage is a Direct Current (DC) input voltage, and may be a rectified DC voltage, or a rectified and filtered DC voltage. I represents a starting means, II represents a transformer, III represents a switching means, IV represents an outputting means, V represents a semiconductor light source as a load.

The starting means I is used for ensuring the switching means to be in a turn-on state during a starting phase (that is, when the input signal Vin is initially supplied). The transformer II includes a first coil and a second coil coupled to each other, the second coil is used for receiving the input voltage and for storing or releasing energy under the control of the switching means III. An induced signal is generated on the first coil of the transformer due to a coupling effect between the first coil and the second coil and is used for controlling turn-on or turn-off of the switching means III. The outputting means is used for supplying power to the semiconductor light source differently according to the energy saving or releasing of the second coil.

Figure 2:
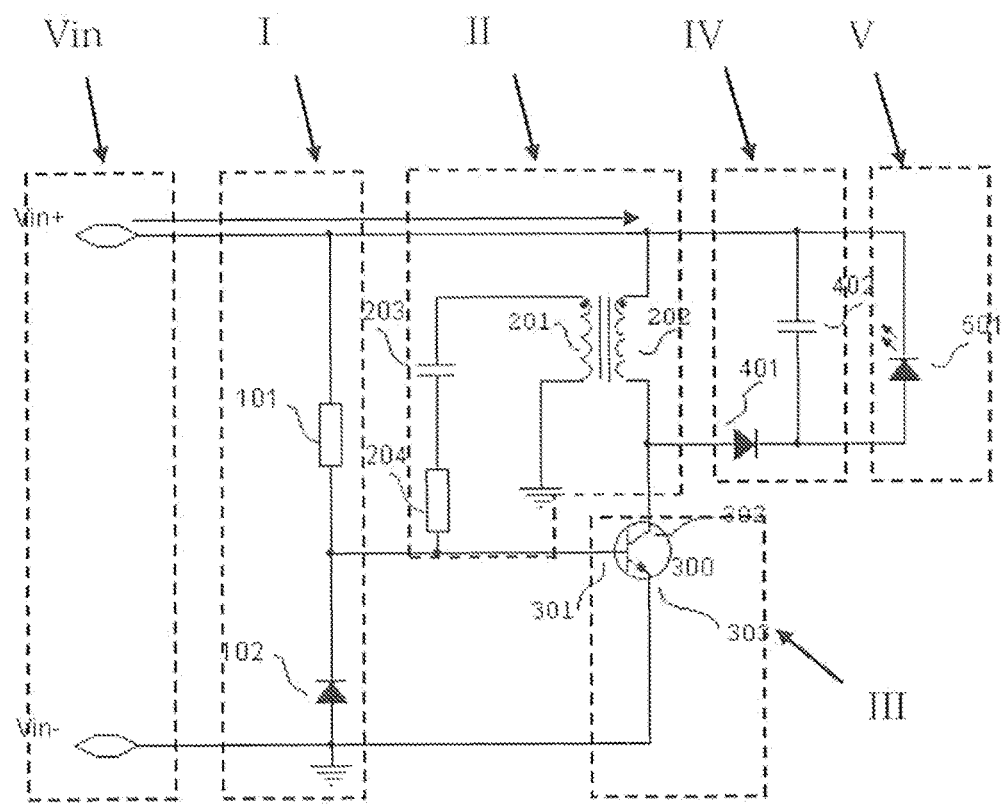
FIG. 2 is a circuit diagram of a driving system for a semiconductor light source according to an embodiment of the present disclosure.

FIG. 2 is a circuit diagram of a driving system for a semiconductor light source according to an embodiment of the present disclosure.

In FIG. 2, the starting means I includes a first resistor 101 and a first diode 102 connected together in series. A first terminal of the first resistor 101 is connected to a first voltage input terminal, and a second terminal of the first resistor 101 is connected to a first terminal of the first diode 102, and a second terminal of the first diode 102 is connected to a second voltage input terminal. The second voltage input terminal can be grounded directly. Those skilled in the art should understand that the resistor may be replaced by other resistive elements, and the diode may also be replaced by other unidirectional conducting elements (for example, a triode).

The transformer II includes a first coil 201 and a second coil 202 coupled to each other. The first coil 201, a first capacitor 203 and a second resistor 204 are connected in series. A first terminal of the first coil 201 is connected to a first terminal of the first capacitor 203, and a second terminal of the first capacitor 203 is connected to a first terminal of the second resistor 204. A second terminal of the first coil 201 is grounded. A first terminal of the second coil 202 is connected to the first voltage input terminal. The first terminal of the first coil 201 and the first terminal of second coil 202 are dotted terminals. The second coil 202 and the switching means are connected in series, so as to store or release energy under the control of the switching means. Those skilled in the art should understand that the capacitor may be replaced by other elements with a capacitive function, and the resistors may also be replaced by other elements with a resistive function.

The switching means III in FIG. 2 includes a triode 300 including a base 301, a collector 302 and an emitter 303. In the embodiment of the present disclosure, the emitter 303 is connected to the second voltage input terminal.

The switching means III may be a MOS transistor, a gate of the MOS transistor is equivalent to the base of the triode, a source of the MOS transistor is equivalent to the collector of the triode, and a drain of the MOS transistor is equivalent to the emitter of the triode.

A second terminal of the second resistor 204 is connected to the base 301 of the triode 300, and is connected to the second terminal of the first resistor 101. The second terminal of the second coil 202 is connected to the collector 302 of the triode 300.

The outputting means IV includes a second diode 401 and a second capacitor 402 connected together in series, a series connection of the second diode 401 and the second capacitor 402 is connected to the second coil 202 in parallel. A first terminal of the second diode 401 is connected to the second terminal of the second coil 202, the second terminal of the second diode 401 is connected to a second terminal of the second capacitor 402, and a first terminal of the second capacitor 402 is connected to the first voltage input terminal. In addition, the first terminal of the second capacitor 402 is connected to a first terminal of a semiconductor light source as a load V, and the second terminal of the second capacitor 402 is connected to a second terminal of the semiconductor light source as the load V.

The semiconductor light source as the load V includes one or more semiconductor light sources, for example, lighting sources such as LEDs or OLEDs, connected in various manners.

With reference to FIG. 3A-3D, an operational principle of the driving system for the semiconductor light source described in the embodiment of the present disclosure will be described as follows.

Figure 3A:
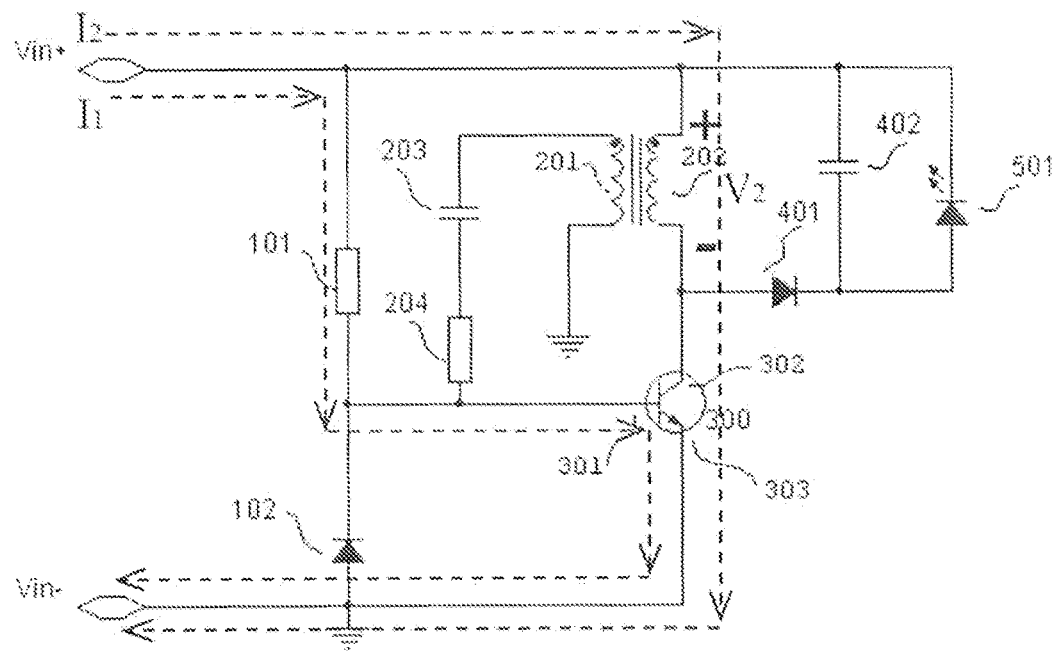
FIG. 3A is a schematic diagram for a starting phase of the driving system for the semiconductor light source according to the embodiment of the present disclosure.

During a starting phase, as shown in FIG. 3A, after the driving system for the semiconductor light source described in the embodiment of the present disclosure is connected to the DC input voltage Vin, a current I1 is generated by Vin being discharged through the first resistor 101 and the base 301 and the emitter 303 of the triode 300, such that an electric conduction is established between the collector 302 and the emitter 303 of the triode 300. A current I2 is generated by Vin being discharged through the second coil 202 and the collector 302 and the emitter 303 of the triode 300. Thereafter, the driving system of the semiconductor light source described in the embodiment of the present disclosure enters into a first energy storing phase.

Figure 3B:
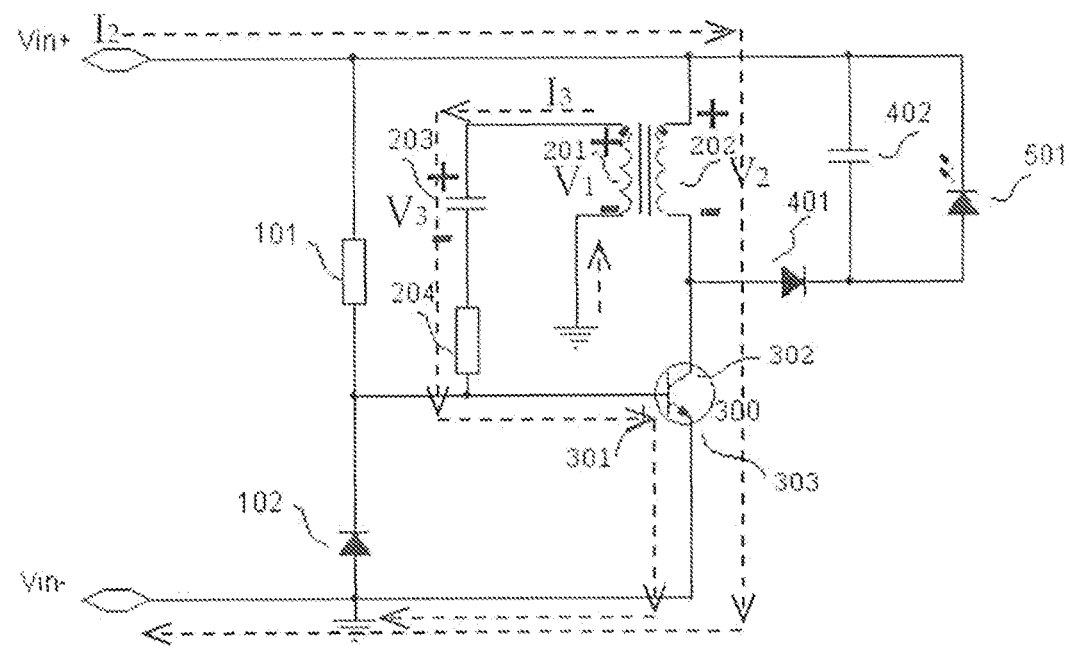
FIG. 3B is a schematic diagram for a first energy storing phase of the driving system for the semiconductor light source according to the embodiment of the present disclosure.

During the first energy storing phase, as shown in FIG. 3B, I2 flows through the second coil 202, the second coil 202 stores energy, and a voltage V2 is generated across the second coil 202, meanwhile an induced electromotive force (EMF) V1 is generated on the first coil 201 due to a coupling effect between the first coil 203 and the second coil 202, and a current I3 is generated by V1 being discharged through the first capacitor 203, the second resistor 204 and the base 301 and the emitter 303 of the triode 300. The first capacitor 203 is charged by I3. A voltage V3 with a direction as shown is generated across the first capacitor 203. With increase of V3, I3 is reduced, and in turn the triode 300 is turned off. However, since the current flowing through the second coil 202 cannot change suddenly, the current flows to the semiconductor light source as the load through the second diode 401 and enables the voltage V2 across the second coil 202 to be inverted. Thereafter, the driving system for the semiconductor light source as described in the embodiment of the present disclosure enters into an energy releasing phase, and the semiconductor light source as the load V starts to emit light.

Figure 3C:
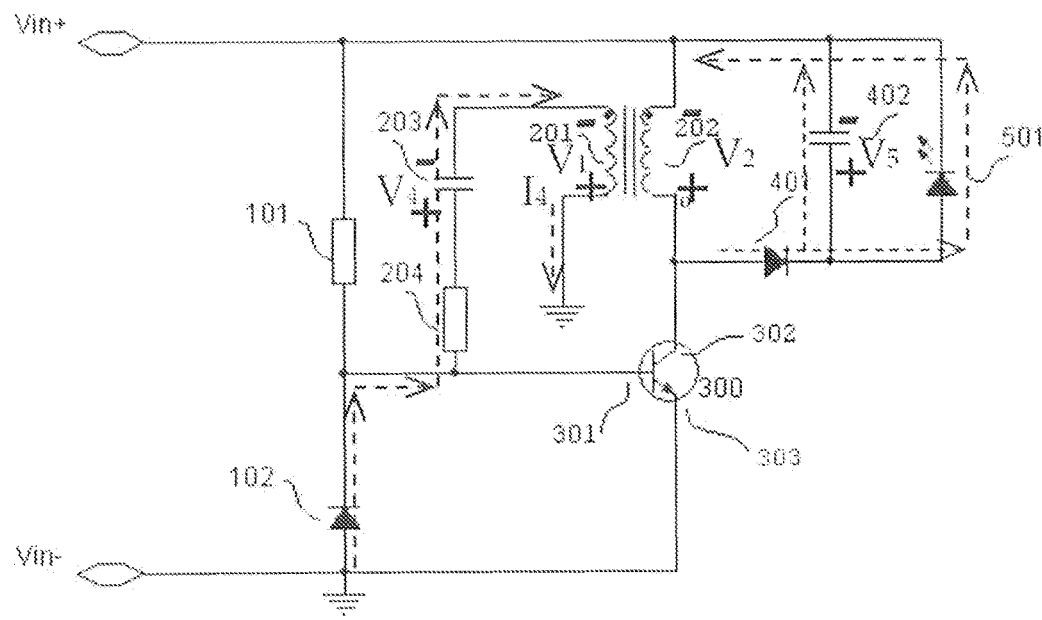
FIG. 3C is a schematic diagram for an energy releasing phase of the driving system for the semiconductor light source according to the embodiment of the present disclosure.

During an energy releasing phase, as shown FIG. 3C, likewise, the induced EMF V1 on the first coil 201 due to the coupling effect between the first coil 201 and the second coil 202 are inverted. A current I4 is generated by V1 being discharged through the first diode 102, the second resistor 204 and the first capacitor 203. The triode 300 is turned off. V2 across the second coil 202 is discharged through the second diode 401 and the semiconductor light source as the load V, the second coil 202 releases energy, and meanwhile the second capacitor 402 is charged to generate a voltage V5 across the second capacitor 402. The voltage V4 is inverted since the first capacitor 203 is charged reversely by the current I4. The second coil 202 stops releasing energy when the voltage V2 across the second coil 202 is decreased to be lower than the voltage V5 across the second capacitor 402. Thereafter, the driving system for the semiconductor light source described in the embodiment of the present disclosure enters into a second energy storing phase different from the first energy storing phase. In the second energy storing phase, the semiconductor light source as the load V emits light.

Figure 3D:
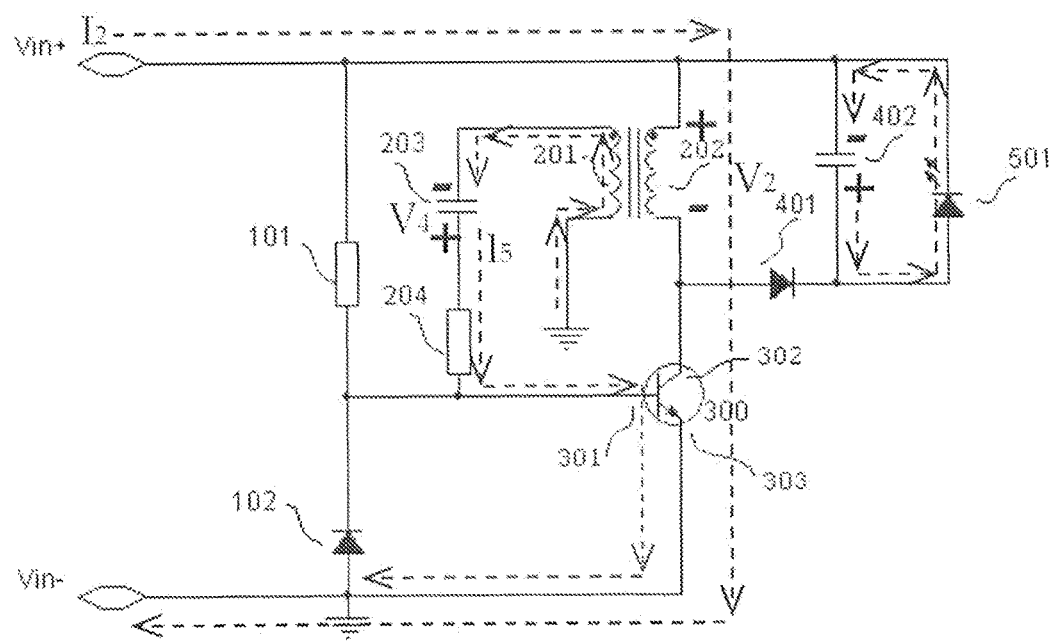
FIG. 3D is a schematic diagram for a second energy storing phase of the driving system for the semiconductor light source according to the embodiment of the present disclosure.

During the second energy storing phase, as shown in FIG. 3D, the voltage V5 across the second capacitor 402 is discharged through the semiconductor light source as the load, and the voltage V4 across the first capacitor 203 is discharged through the resistor 204, the base 301 and the emitter 303 of the triode 300 and the first coil 201, such that an electric conduction is established between the collector 302 and the emitter 303 of the triode 300. A current I2 is generated by Vin being discharged through the second coil 202 and the collector 302 and the emitter 303 of the triode 300. The second coil 202 stores energy and generates a voltage V2 across the second coil 202. Thereafter, descriptions will be given continuously with reference to the transformer II and the switching means III in FIG. 3B. An induced EMF V1 is generated on the first coil 201 due to the coupling effect between the first coil 201 and second coil 202, and a current I3 is generated by V1 being discharged through the first capacitor 203, the second resistor 204 and the base 301 and the emitter 303 of the triode 300. The first capacitor 203 is charged by I3. A voltage V3 with a direction as shown is generated across the first capacitor 203. With increase of V3, I3 is reduced, and in turn the triode 300 is turned-off. However, since the current flowing through the second coil 202 cannot change suddenly, the current flows to the semiconductor light source as the load through the second diode 401 and enables the voltage V2 across the second coil 202 to be inverted. Thereafter, the driving system for the semiconductor light source as described in the embodiment of the present disclosure enters into the energy releasing phase again.

Thereafter, the driving system for the semiconductor light source as described in the embodiment of the present disclosure re-enters into the second energy storing phase from the energy releasing phase, and a repeated loop is thus formed.

Below, operations of the triode 300 during the respective phases will be described in further detail.

During the starting phase, as shown in FIG. 3A, the current I1 is generated by Vin through the first resistor 101 and the base 301 and the emitter 303 of the triode 300, such that the triode 300 is turned on and operates in an amplification region.

Then, during the first energy storing phase, as shown in FIG. 3B, the current I3 is generated by the induced EMF V1 on the first coil 201 through the first capacitor 203, the second resistor 204 and the base 301 and the emitter 303 of the triode 300, such that the triode 300 enters into a saturation region. While the current I3 charges the first capacitor 203 to enable the voltage V3 across the first capacitor 203 to be increased, the current I3 is decreased to enable the triode 300 to quit the saturation region and enter into a cutoff region. However, since the current I2 flowing through the second coil 202 cannot change suddenly, the current I2 flows to the semiconductor light source as the load through the second diode 401 and enables the voltage V2 across the second coil 202 to be inverted.

Thereafter, during the energy releasing phase, as shown FIG. 3C, the triode 300 is turned off, the voltage across the first coil 201 is inverted while the voltage across the second coil 202 is inverted, and the first capacitor 203 is charged reversely through the second resistor 204 and the first diode 102.

Then, during the second energy storing phase, as shown in FIG. 3D, the current I3 is generated by the induced EMF Vin on the first coil 201 through the first capacitor 203, the second resistor 204 and the base 301 and the emitter 303 of the triode 300, such that the triode 300 enters the saturation region again and the second coil 202 begins to store energy. Then, while the current I3 charges the first capacitor 203 to enable the voltage V3 across the first capacitor 203 to be increased, the current I3 is decreased to enable the triode 300 to quit the saturation region and enter into the cutoff region.

Thereafter, the energy releasing phase is re-entered. In such manner, a repeated loop is thus formed from the second energy storing phase and the energy releasing phase.

Figure 4:
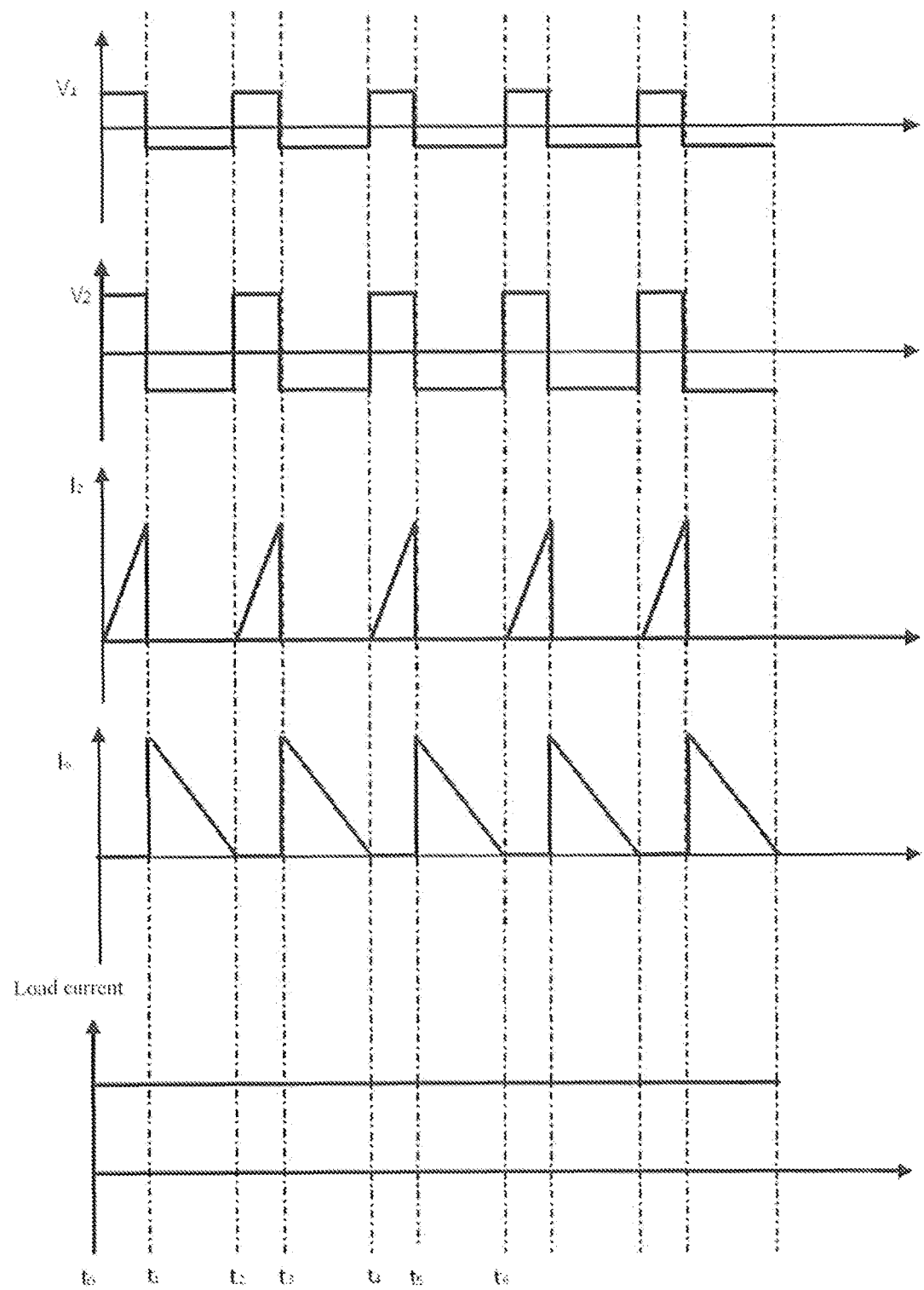
FIG. 4 shows a waveform of voltages and currents when the driving system for the semiconductor light source according to the embodiment of the present disclosure operates.

As shown in FIG. 4, a waveform of voltages and currents when the driving system for the semiconductor light source according to the embodiment of the present disclosure operates is given. It should be noted that the waveform for the starting phase is not shown in FIG. 4.

At a timing t0, the current I2 is generated by Vin being discharged through the second coil 202 and the collector 302 and the emitter 303 of the triode 300, and the second coil 202 begins to store energy; the induced EMF V1 is generated on the first coil 201, the current I3 is generated by V1 being discharged through the first capacitor 203, the second resistor 204 and the base 301 and the emitter 303 of the triode 300, and the first capacitor 203 is charged by I3.

At a timing t1, the voltage V3 across the first capacitor 203 is approximately equal to the induced EMF V1 generated on the first coil 201, I3 is decreased such that the triode 300 is turned off. However, since the current I2 flowing through the second coil 202 cannot change suddenly, the second coil 202 generates a current Io which flows through the second diode 401 to enable the semiconductor light source as the load V to emit light, the current Io is gradually decreased, the voltage V2 across the second coil 202 is inverted and begins to release energy.

Then, at a timing t2, the voltage across the second capacitor 402 is equal to the voltage V2 across the second coil 202, and the second coil 202 stops releasing energy and the second capacitor 402 supplies power to the semiconductor light source as the load V. On the other hand, the voltage V4 across the first capacitor 203 is discharged through the resistor 204, the base 301 and the emitter 303 of the triode 300 and the first coil 201 to generate the current I5, such that the electrical conduction between the collector 302 and the emitter 303 of the triode 300 is established; the current I2 is generated by Vin being discharged through the second coil 202 and the collector 302 and the emitter 303 of the triode 300, and the second coil 202 begins to store energy.

Thereafter, at a timing t3, the voltage V3 across the first capacitor 203 is approximately equal to the induced EMF V1 generated on the first coil 201, I3 is decreased such that the triode 300 is turned off. However, since the current I2 flowing through the second coil 202 cannot change suddenly, the second coil 202 generates a current Io which flows through the second diode 401 to enable the semiconductor light source as the load V to emit light, the current Io is gradually decreased, the voltage V2 across the second coil 202 is inverted and the second coil 202 begins to release energy.

Then, from a timing t4, the operation sequence from t2 to t4 is repeated. That is, the operation sequence from t2 to t4 is repeated during a time period t4-t6, a time period t6-68, and so on.

Although a NPN type triode is adopted to constitute the switching means III in the embodiments of the present disclosure, the present disclosure is not limited thereto. Those skilled in the art should easily think of adopting a PNP type triode to constitute the switching means III and modify the connection configuration of the starting means I, the transformer II, the switching means III and the outputting means IV correspondingly, such modification should be included in the scope of the present disclosure.

In addition, those skilled in the art should also easily think of adopting a N type transistor or a P type transistor to constitute the switching means and modify the connection configuration of the starting means I, the transformer II, the switching means III and the outputting means IV correspondingly, such modification should also be included in the scope of the present disclosure.

The above embodiments are only illustrative and should not make any limitation to technical solutions of the present disclosure. Although the present disclosure has been described with reference to preferred embodiments thereof, those skilled in the art should understand that the technical solution of the present disclosure may be modified or equivalently replaced without departing the spirit and scope of the technical solutions of the present disclosure. Such modifications and equivalent replacement are intended to be included within the spirit and scope of the present disclosure.

What is claimed is:

1. A driving system for a semiconductor light source including:
   a transformer (II) including a first coil (201) and a second coil (202) coupled to each other, wherein a first terminal of the second coil (202) is connected to a first voltage input terminal for receiving an input voltage, wherein an induced signal is generated on the first coil (201) of the transformer due to a coupling effect between the first coil (201) and the second coil (202);
   a switching means (III) connected to the second coil (202) of the transformer in series and for controlling energy-storing and energy-releasing of the second coil (202);
   an outputting means (IV) connected to the second coil (202) of the transformer in parallel and for supplying power to the semiconductor light source, wherein a first terminal of the outputting means is connected to the first terminal of the second coil, and a second terminal of the outputting means is connected to a second terminal of the second coil,
   wherein the switching means includes a switch (300), a capacitive element (203) and a resistive element (204), wherein the capacitive element (203) and the resistive element (204) are connected in series between one end of the first coil (201) and a control terminal (301) of the switch (300), the other end of the first coil (201) of the transformer is grounded, and the induced signal generated on the first coil (201) is adapted to control charging and discharging of the capacitive element (203), and the charging and discharging of the capacitive element (203) is adapted to control turn-on and turn-off of the switch (300).

2. The driving system of claim 1, wherein the second coil (202) supplies power to the semiconductor light source and charges the outputting means when the second coil (202) is in energy-releasing, and the outputting means supplies power to the semiconductor light source when the second coil (202) is in energy-storing.

3. The driving system of claim 1, further including a starting means for starting the switching means when the input signal is initially supplied.

4. The driving system of claim 3, wherein the starting means includes a resistive element (101) and a unidirectional conducting element (102) connected together in series, a connection point between the resistive element (101) and the unidirectional conducting element (102) is connected to the control terminal (301) of the switch (300).

5. A semiconductor lighting device including:
   a semiconductor light source as a load;
   a transformer (II) including a first coil (201) and a second coil (202) coupled to each other, wherein a first terminal of the second coil (202) is connected to a first voltage input terminal for receiving an input voltage, wherein an induced signal is generated on the first coil (201) of the transformer due to a coupling effect between the first coil (201) and the second coil (202);
   a switching means (III) connected to the second coil (202) of the transformer in series and for controlling energy-storing and energy-releasing of the second coil (202);
   an outputting means (IV) connected to the second coil (202) of the transformer in parallel and for supplying power to the semiconductor light source, wherein a first terminal of the outputting means is connected to the first terminal of the second coil, and a second terminal of the outputting means is connected to a second terminal of the second coil,
   wherein the switching means includes a switch (300), a capacitive element (203) and a resistive element (204),
   wherein the capacitive element (203) and the resistive element (204) are connected in series between one end of the first coil (201) and a control terminal (301) of the switch (300), the other end of the first coil (201) of the transformer is grounded, and the induced signal generated on the first coil (201) is adapted to control char ing and discharging of the capacitive element (203), and the charging and discharging of the capacitive element (203) is adapted to control turn-on and turn-off of the switch (300).

6. The semiconductor lighting device of claim 5, further including a starting means for starting the switching means when the input signal is initially supplied.

* * * * *